United States Patent Office 2,862,923
Patented Dec. 2, 1958

2,862,923
17-(PYRIDINEACRYLYL)-4-ANDROSTEN-3-ONES

Raymond M. Dodson, Park Ridge, Ill., assignor to G. D. Searle & Co., Chicago, Ill., a corporation of Delaware No Drawing. Application April 2, 1956
Serial No. 575,333

4 Claims. (Cl. 260—239.5)

The present invention relates to a new group of heterocyclic derivatives of steroids and, more specifically, to 17-(pyridineacrylyl)-4-androsten-3-ones which can be represented by the general structural formula

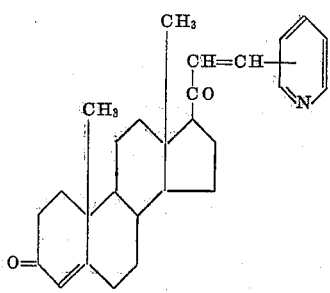

The compounds of this invention are of value because of their hormonal effect and particularly their antihypertensive and luteoid action.

As described in my copending application, Serial No. 472,775, filed December 2, 1954, now U. S. Patent No. 2,753,341, of which the present application is a continuation-in-part the compounds of this invention are conveniently prepared by Oppenauer oxidation of the corresponding 17 - pyridineacrylyl-5-androsten-3-ols. The 4-androsten-3-ones of this invention differ in their physiological properties from the 5-androsten-3-ols from which they are derived in that they lack the effects of the latter on the heart muscle.

The pyridine derivatives of this invention form salts with inorganic and strong organic acids including hydrochloric, hydrobromic, hydriodic, sulfuric, phosphoric, sulfamic, acetic, propionic, butyric, benzoic, cinnamic, citric, lactic, ascorbic, gluconi, and related acids.

The compounds which constitute this invention and the methods for their preparation will appear more fully from the consideration of the following examples. However, these are not to be construed as limiting the invention in spirit or in scope. Quantities of materials are indicated in parts by weight and temperatures in degrees centigrade.

Example 1

In 100 parts of methanol there are dissolved first 2.3 parts of sodium, then, with heating, 6.32 parts of 3-hydroxy-5-pregnen-20-one and finally, 4.28 parts of isonicotinaldehyde. The reaction mixture is permitted to stand at room temperature for a week after which the precipitate is collected on a filter, and washed with cold methanol. The product thus obtained is recrystallized from acetone to yield a 17-(4-pyridineacrylyl)-5-androsten-3-ol which melts at about 229.5–231.5° C.

To an anhydrous mixture of 2 parts of this compound, 30 parts of toluene and 20 parts of cyclohexanone are added 2.5 parts of aluminum isopropoxide in 10 parts of toluene. The resulting mixture is heated for 20 minutes under reflux and then poured into 100 parts of a saturated aqueous Rochelle salt solution. After removal of the organic solvents by steam distillation, the residue is collected on a filter and applied in a 50% solution of benzene in petroleum ether to a chromatography column containing 150 parts of alumina. The column is washed with mixtures of petroleum ether and benzene containing increasing concentrations of benzene, with pure benzene and is then developed with benzene solutions containing increasing concentrations of ethyl acetate in benzene. Elution with a 5% solution of ethyl acetate in benzene and trituration of the eluate with ether yields a precipitate which is recrystallized successively from ether, dilute methanol and ether to yield 17-(4-pyridineacrylyl)-4-androsten-3-one melting at about 152.5–155° C. The specific optical rotation, as determined in a chloroform solution, is $[\alpha]_D=+224°$. The ultraviolet absorption spectrum shows a maximum at 247.5 millimicrons with a molecular extinction coefficient of about 26,400. The product has the structural formula

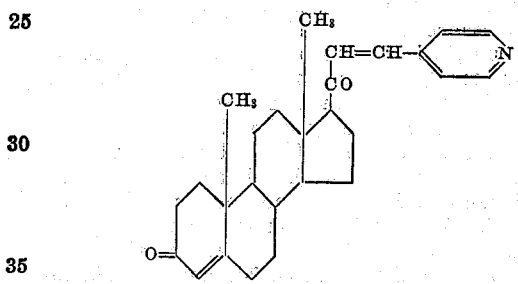

Example 2

To a solution of 2.3 parts of sodium in 100 parts of methanol, there are added 6.32 parts of 3-hydroxy-5-pregnen-20-one and then 4.28 parts of nicotinaldehyde. After standing at room temperature for 15 hours the mixture is filtered and the material collected on the filter is washed with methanol. On crystallization from ethanol, the 17-(3-pyridineacrylyl)-5-androsten-3-ol thus obtained melts at about 193–195° C.

To an anhydrous mixture of 2 parts of 17-(3-pyridineacrylyl)-5-androsten-3-ol in 30 parts of toluene and 20 parts of cyclohexanone are added 2.5 parts of aluminum isopropoxide in 10 parts of toluene. The mixture is heated at reflux for 20 minutes, poured into 100 parts of a saturated aqueous Rochelle salt solution and then steam distilled to remove the organic solvents. The solid residue is collected on a filter and crystallized successively first from dilute methanol, then from acetone and petroleum ether, and then again from methanol to yield 17-(3-pyridineacrylyl)-4-androsten-3-one melting at about 253–255° C. The specific optical rotation in chloroform is $[\alpha]_D=+191.1°$.

The mother liquors from the above crystallizations are combined, evaporated to a small volume and applied in a 42% solution of benzene in petroleum ether to a chromatography column containing 150 parts of alumina. The column is developed with petroleum ether solutions containing 46, 50, 60, 70, 80, and 90% of benzene, with benzene, and a 2% solution of ethyl acetate in benzene. Elution with a 5% solution of ethyl acetate in benzene and concentration of the eluate yields a residue which is crystallized successively from a mixture of petroleum ether and acetone, dilute methanol and a mixture of acetone and cyclohexane. The resulting isomeric form of 17 - (3 - pyridineacrylyl)-4-androsten-3-one melts at about 188–189.5° C. and has a specific rotation of [α]_D = +217° in chloroform. Both isomers thus formed have the structural formula

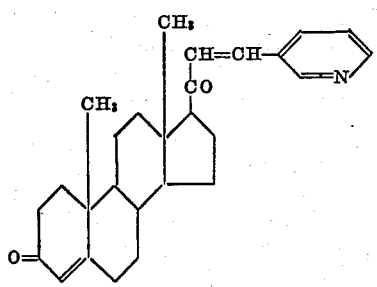

Example 3

In a solution of 23 parts of sodium in 1000 parts of methanol there are dissolved first 63.2 parts of 3-hydroxy-5-pregnen-20-one and then 42.8 parts of picolinaldehyde. After standing at room temperature for 3 days the precipitate is collected on a filter and crystallized from acetone and ethanol, the mother liquor being saved. The crystals on further recrystallization from methanol melt at about 214–215.5° C.

To a solution of one part of the 17-(2-pyridineacrylyl)-5-androsten-3-ol thus obtained in 15 parts of toluene and 10 parts of cyclohexanone are added 1.25 parts of aluminum isopropoxide in 5 parts of toluene. After heating under reflux for 20 minutes, the mixture is poured into 100 parts of saturated Rochelle salt solution. The organic solvents are removed by steam distillation and the solid residue is collected on a filter. Upon repeated recrystallization from dilute methanol the 17-(2-pyridineacrylyl)-4-androsten-3-one thus obtained melts at about 232–234° C. A chloroform solution shows a specific rotation of [α]_D = +192°. The ultraviolet absorption spectrum shows maxima at about 246 and 292 millimicrons with molecular extinction coefficients of about 24,000 and 18,000, respectively. The compound has the structural formula

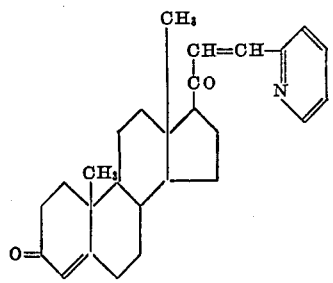

What is claimed is:
1. A compound of the structural formula

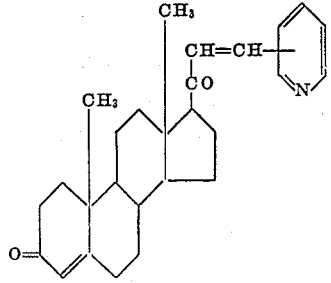

2. 17-(4-pyridineacrylyl)-4-androsten-3-one.
3. 17-(3-pyridineacrylyl)-4-androsten-3-one.
4. 17-(2-pyridineacrylyl)-4-androsten-3-one.

References Cited in the file of this patent
UNITED STATES PATENTS

| | | |
|---|---|---|
| 2,665,274 | Conbere | Jan. 5, 1954 |
| 2,750,380 | Dodson | June 12, 1956 |
| 2,753,341 | Dodson | July 3, 1956 |

OTHER REFERENCES

King: JACS, vol. 66, page 1612 (1944).